United States Patent

[11] 3,598,145

| [72] | Inventor | Joseph Wolfson<br>Rocky Hill, Conn. |
|---|---|---|
| [21] | Appl. No. | 837,769 |
| [22] | Filed | June 30, 1969 |
| [45] | Patented | Aug. 10, 1971 |
| [73] | Assignee | Bloomfield Valve Corporation<br>Bloomfield, Conn.<br>Continuation-in-part of application Ser. No. 688,113, Dec. 5, 1967, now abandoned. |

[54] CHECK VALVE
10 Claims, 5 Drawing Figs.

[52] U.S. Cl. .................................................. 137/533.21,
251/333, 251/360, 251/368
[51] Int. Cl. .................................................. F16k 15/06
[50] Field of Search .......................................... 251/114 B,
157, 172, 333, 334, 360—365; 137/330, 542 US,
543, 533.29, 533.31

[56] References Cited
UNITED STATES PATENTS

| 3,441,051 | 4/1969 | Morse | 137/533.25 X |
| 2,223,699 | 12/1940 | Norgren | 137/533.21 X |
| 2,330,610 | 9/1943 | Natter | 251/360 X |
| 2,904,065 | 9/1959 | Butlin | 251/368 X |
| 3,459,218 | 8/1969 | Cranage | 137/469 X |

*Primary Examiner*—Alan Cohan
*Assistant Examiner*—Richard Gerard
*Attorney*—Fishman and Van Kirk ABSTRACT: A check valve having a valve seat which may be readily replaced, said seat being comprised of a high-temperature plastic material. Cooperating with the seat is a disc member which also is comprised of a high-temperature plastic material, the disc member being characterized by a sail which will be acted upon by fluid in the system to cause rapid and full opening and closing of the valve regardless of the position thereof.

PATENTED AUG 10 1971  3,598,145

INVENTOR
JOSEPH WOLFSON

BY

FISHMAN & VAN KIRK
ATTORNEYS

CHECK VALVE

CROSS-REFERENCE TO RELATED APPLICATION

This application is a continuation-in-part of application Ser. No. 688,113 filed Dec. 5, 1967 and since abandoned.

BACKGROUND OF THE INVENTION

1. Field of the Invention

The present invention relates to valves. More particularly, the present invention is directed to check valves having readily replaceable components and being operable in any position. Accordingly, the general objects of the present invention are to provide improved apparatus of such character.

2. Description of the Prior Art

Presently available valves, and particularly check valves, have one or more inherent deficiencies. Perhaps the most significant of these deficiencies resides in the fact that present valves cannot usually be repaired and repair, when possible, requires removal of the valve from the fluid system in which it is connected. Thus, should the valve seat of plug become eroded thereby causing leakage, is necessary to perform the time-consuming task of removing and replacing the valve.

Another deficiency found in presently available check valves with the exception of the relatively expensive electromagnetic devices is that the valve will generally not open fully in response to fractional pressure. Thus, should system pressure drop, present check valves will respond by adding resistance to the system.

While it has been proposed to employ self-lubricating materials such as Teflon in valves, valves employing such self-lubricating materials have generally been characterized by metal parts having a coating of the material thereon. Such coatings, of course, suffer degradation with time and use and recoating is generally neither possible nor practical.

A further problem which has characterized prior art valves is that, due to their design, there is the residual possibility that certain flow conditions can cause canting of the plug member whereby, upon a pressure reversal, the valve will jam rather than close. The possibility of plug canting becomes particularly acute upon the occurrence of a fractional pressure condition as discussed above.

While usually giving adequate performance during their comparatively limited lives, presently available check valves are not characterized by rapid action. In most cases, a spring member or diaphragm maintains the valve in one operative condition and it is necessary to overcome the force imposed by the spring or diaphragm when switching to the other operative condition. The overcoming of these forces, of course, takes time thereby limiting the speed of response of present valves.

It is also to be noted that presently available check valves are designed for use in a particular environment and are not susceptible to interchangeable use in both liquid and gas systems. This, of course, presents a distinct disadvantage, particularly when it is desired to simulate one type of system with another.

SUMMARY OF THE INVENTION

The present invention overcomes the above-discussed disadvantages of the prior art and in so doing provides a check valve of novel and improved design. The valve of the present invention comprises a body portion which may be fabricated from any metal or plastic as might be determined by the particular application. The valve is further characterized by a "snap-in" seat comprised of a "self-lubricating" plastic material. Due to its configuration, the seat of the present valve may be readily replaced without removal of the valve from the fluid system in which it is incorporated. The present valve also comprises a disk member which cooperates with the "snap-in" seat to produce the valving action. The disk member is also both removable and comprised of a "self-lubricating" plastic material and thus is characterized by light weight. The disk member consists of a guidepost and a plug which are separated by a sail portion. The surface areas of the sail portion are sufficiently large so that, coupled with the light weight of the disk member, the valve will be fully opened and rapidly closed in response to pressure which is a fraction of the normal system pressure.

It is therefore an object of the present invention to provide a valve having a seat which is replaceable without removing the valve from the fluid system in which it is employed.

It is also an object of the present invention to provide a valve having readily replaceable seat and disk members.

It is a further object of the present invention to provide a valve which will operate on fractional pressure.

It is another object of the present invention to provide a valve which is incapable of sticking due to canting of the disk member.

It is yet another object of the present invention to provide a check valve having faster response than previous devices of such character.

It is still another object of the present invention to provide a valve which will operate in any position.

It is also an object of the present invention to provide a valve which may be employed in either liquid or gas systems.

BRIEF DESCRIPTION OF THE DRAWING

The present invention may be better understood and its numerous objects and advantages will become apparent to those skilled in the art by reference to the accompanying drawing wherein like reference numerals refer to like elements in the various figures and in which.

DESCRIPTION OF THE PREFERRED EMBODIMENT

Figure 1:
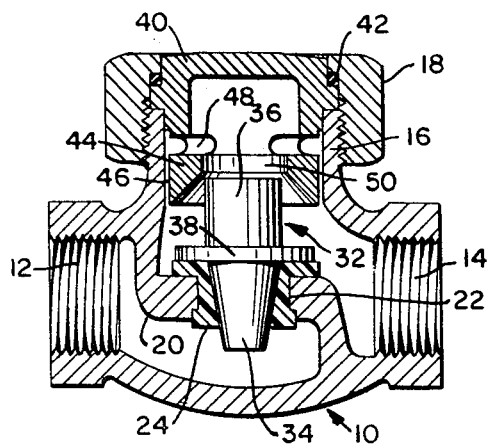
FIG. 1 is a cross-sectional view of a first embodiment of the present invention shown in the closed position.

Referring now to FIG. 1, the body of the disclosed preferred embodiment of the check valve of the present invention is indicated generally at 10. Valve body 10 is provided with internally threaded connector portions 12 and 14 by which the valve may be connected into a fluid flow system. Valve body 10 is also provided with an externally threaded portion 16 by means of which cap 18 is attached to the valve body. The purpose of cap 18 will be discussed in greater detail below. The valve body will typically be cast from a metal having the desired characteristics taking into account the environment in which it is to be used. Valve body 10 could, of course, also be plastic and the valve body could be machined rather than cast.

Internally of valve body 10, a web member 20 extends from one side of the valve body adjacent connector portion 12 to the opposite side of the valve body adjacent connector portion 14. Web member 20 has a hole 22 therein intermediate its ends. Under normal operating conditions, fluid flowing into the valve housing 10 through connector portion 12 will pass through hole 22 in web member 20 and leave the valve housing via connector portion 14.

An apertured valve seat member, indicated generally at 24, is positioned in hole 22 in web member 20. Valve seat member 24 will be comprised of a "self-lubricating," high-temperature plastic material, Teflon being preferable. Teflon seat member 24 is formed by state of the art techniques so as to have a frustoconical or inwardly tapering internal surface. Shaping of the valve member in this manner provides maximum seating surface. Tests have shown that the diameter of the smaller end of the aperture in the valve seat 24 should be within the ratio of 1/2.66 to 1/1.25 of the diameter of the aperture at the other side of the seat, a 1:2 ratio being preferred. As may be clearly seen from the joint consideration of FIGS. 1 and 3, the exterior of seat member 24 is provided with an intermediate portion 26 of constant diameter and a pair of opposite end portions or flanges 28 and 30 of increased diameter, flanges 28 and 30 defining internal shoulders facing intermediate portion 26. The outer diameter of portion 26 is equal to the diameter of hole 22 in web member 20 of the valve housing and the distance between the oppositely facing shoulders defined by flanges 28 and 30 is equal to the thickness of web member 20. Since Teflon has a certain degree of resiliency, seat member 24 may be forced through the hole 22 in web member 20 and thus may be snapped into position in the valve housing. Removal and replacement of seat 24, if such should become necessary, will be described below.

Cooperating with valve seat 24 to perform the valving action is a disk member indicated generally at 32. Disk member 32 has a frustoconical shaped plug portion 34, a guidepost 36 and, intermediate guidepost 36 and plug 34, a sail member 38. The areas of the exposed upper and lower surfaces of sail portion 34 are considerably greater than those of either the top guidepost 36 or the bottom of plug 34. The disk member 32, like valve seat 24, will be comprised of a "self-lubricating" high-temperature plastic, Teflon again being preferred. The size and shape of plug portion 34 of disk member 32 is commensurate with the aperture in valve seat member 24 and thus, with disk member 32 in the position shown in FIG. 1, the valve will be closed and there will be a substantially increased area of contact between the plug and valve seat when compared to prior art devices of like character.

In the embodiment of FIG. 1, control of the direction of the movement of guidepost 36 of disk member 32 during operation of the valve is provided by a generally cup-shaped guide member 40. Guide member 40 is provided with flanges which rest on the top of externally treated portions 16 of the housing 10. Guide member 40 is held in position by means of valve cap 18 and leakage of system fluid between the cap 18 and guide 40 is prevented by an O-ring seal 42 which is disposed therebetween and compressed between cap 18 and the shoulder defined by the upper end of the flange portion of guide member 40.

The lower portion 44 of guide member 40 is of smaller diameter than the internal diameter of portion 16 of housing 10 and thereby defines an annular passage 46 between the walls of the housing and guide member. The walls of the guide member are provided with one or more vent holes 48 which communicate between the interior of member 40 and the annular passageway 46. Lower portion 44 of guide member 40 is also if increased wall thickness so as to define an opening 50 having a diameter slightly in excess of the diameter of guidepost 36. The opening 50 cooperates with guidepost 36 to define the direction of movement of disk member 32.

Operation of the disclosed preferred embodiment of the present invention will now be described. When pressure is applied to a system of which the valve is a part, the pressure source being connected to connector portion 12 of housing 10, the fluid will act on the bottom of plug member 34 to thereby begin to unseat the plug member from the valve seat 24. As soon as the slightest unseating occurs, the system fluid will act on the lower surface of sail member 38 and, due to the light weight of the disk member and the large surface area of the sail, the effect of the fluid on sail member 38 will be to cause the valve to rapidly open to the position shown in FIG. 2. During opening of the valve, should there be any fluid trapped within guide member 40, this fluid will be vented or forced out of member 40 through holes 48 and passage 46 by the piston action of guidepost 36. The large reaction area or surface presented by sail 38, coupled with the lightweight material from which the disk member 32 is constructed, will keep the valve wide open as long as the pressure differential in the system is in the proper direction. The shape and weight of disk member 32 also has a tendency to keep vibration to a minimum. Since the flow or pressure acting on the bottom of sail 38 holds the disk tightly against the bottom of guide member 40, canting of the disk member to one side is virtually impossible and the least possible resistance to fluid flow is presented by the valve. As noted above, the valve of the present invention will operate in response to pressure which is but a fraction of the normal system pressure.

Should there be a reversal of system pressure, such a pressure reversal will tend to draw disk member 32 back to the closed position. The initial closing action may also be enhanced by the fact that fluid attempting to flow back toward the source connected to portion 12 of housing 10 will enter guide member 40 via passage 46 and holes 48 and will act on the top of guidepost 36. As soon as the slightest gap occurs between the outer edge of sail 38 and the bottom of lower section 44 of guide member 40, the reverse flowing fluid in the system will act upon the upper surface of sail 38 and will immediately and rapidly drive the disk into the seat 24 thereby closing the valve. Thus, under the reversed flow or pressure condition, the sail offers a large reaction surface to fluid in the system and the valve will be closed much more rapidly than would occur in prior art devices of like character. It should be noted that, upon closing, the fluid will act on the upper surface of the sail to keep the sail forced tightly against the upper surface of flange portion 28 of valve seat 24. This further enhances the sealing action of the present invention.

Figure 4:
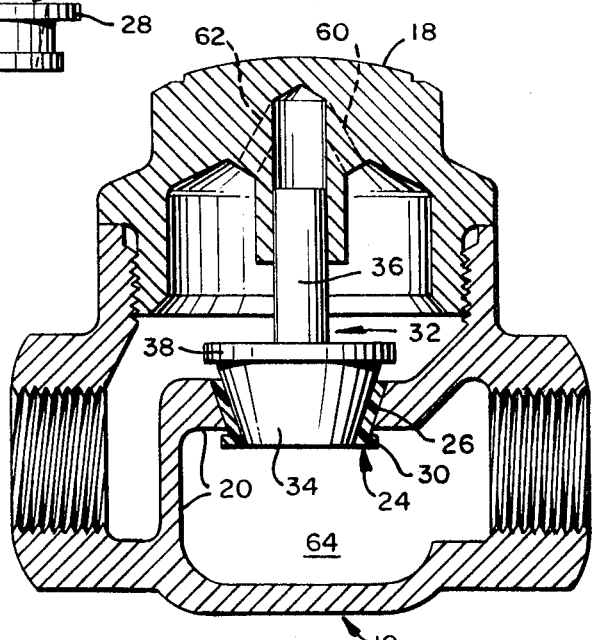
FIG. 4 is a cross-sectional view of a second embodiment of the present invention shown in the closed position.
Figure 5:
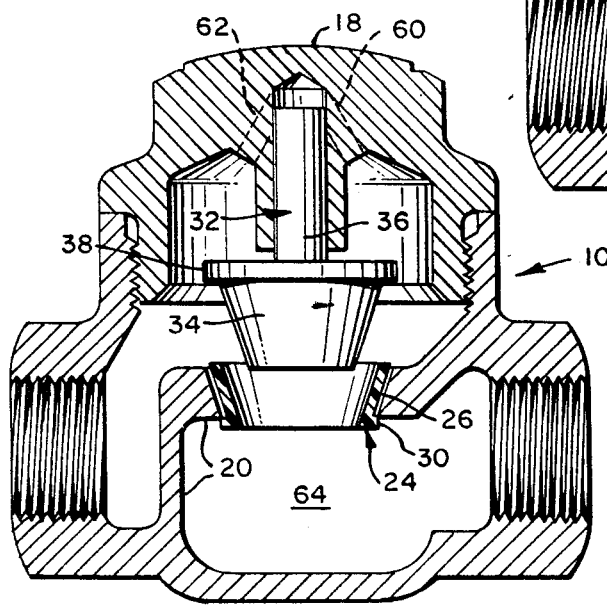
FIG. 5 is a cross-sectional view of the valve of FIG. 4, FIG. 5 showing the valve in the open position.

Referring now to FIGS. 4 and 5, a second embodiment of the present invention is shown. In the interest of insuring that a tight seal will always be achieved with the valve in the closed position, even though there may be some wear of either valve seat member 24 or plug member 34, the embodiment of FIG. 4 and 5 is characterized by a floating seat. Restated, the valve seat 24 of FIGS. 4 and 5 is free to move a limited distance along the flow path of fluid passing through the valve and is also free to rotate except when the valve is in the fully closed position.

Figure 2:
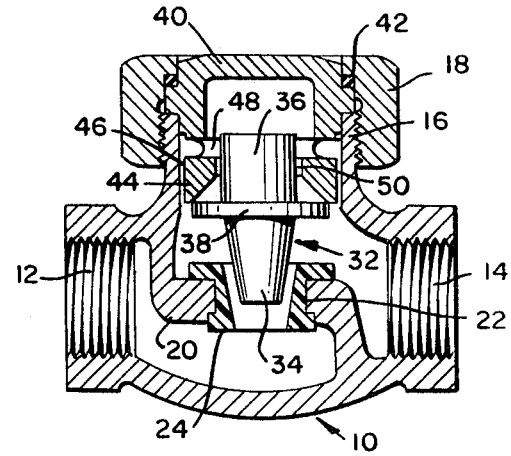
FIG. 2 is a cross-sectional view of the valve of FIG. 1, RIG. 2 showing the valve in the open position.
Figure 3:
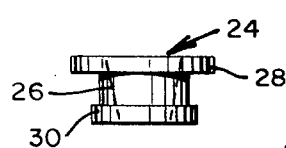
FIG. 3 is a side view of the "snap-in" valve seat of the embodiment of FIG. 1.

As in the embodiment of FIGS. 1—3, the seat member 24 is of the "snap-in" type. Seat member 24 is, however, provided only with a lower flange portion 30 which engages the lower surface of web member 20 of the valve body when fluid is flowing through the valve; flange 30 thereby preventing fluid pressure from causing disengagement of the seat from the web member. With the valve in the closed position, as shown in FIG. 4 and as will be described in greater detail below, flange 30 will be spaced from the lower surface of web member 20.

Unlike the embodiment of FIGS. 1—3, the intermediate portion 26 of the valve seat member 24 of the embodiment of FIGS. 4 and 5 has a tapered outer wall and the walls of the passage in web member 20 are provided with a complementary taper. It is also to be noted that the width of intermediate portion 26 of the valve seat is greater than the width of web member 20. The size of the passage in web member 20 and the exterior dimensions of seat 24 are selected so that, with the valve in the open position as shown in FIG. 5, seat member 24 may rotate and is free to move along the flow path until flange portion 30 contacts the lower surface of web member 20.

The disk member 32 of the embodiment of FIGS. 4 and 5 is similar to that of the embodiment of FIGS. 1 and 2. However, it is to be noted that the guidepost portion 36 of the disk member of FIGS. 4 and 5 is of smaller diameter and is elongated when compared to the guidepost of the embodiment of FIGS. 1 and 2. The guidepost 36 of FIGS. 4 and 5 is at all times received in a channel 60 formed in cap 18; the separate guide member 40 thereby being eliminated from the embodiment of FIGS. 4 and 5. Cap 18 is provided with relief passages 62 so as to enable the fluid flow through channel 60 to wash past stem 36 to keep the stem clean and free in channel 60. As in the embodiment of FIGS. 1 and 2, the disk member 32 comprises, in addition to guidepost 36, a tapered plug portion 34 and a sail portion 38.

As previously noted, the valve body in the embodiment of FIG. 4 is modified so that the cap 18 will cooperate with the guidepost 36 on disk member 32 thereby obviating the need for a separate guide member 40. In addition, the chamber 64 in the valve body upstream of the valve seat has been enlarged in the embodiment of FIGS. 4 and 5 so as to provide for extra volume for full flow. The operation of the embodiment of FIGS. 4 and 5 is similar to that of the embodiment of FIGS. 1—3. However, as previously noted, a deliberate gap which has been left between the flange 30 on the valve seat and the lower part of web member 20 of the valve body with the valve closed. This gap permits limited movement of seat 24 and thus provides enhanced wear capability whereby good seating is obtained even though the face of the plug portion 34 or seal member 24 is wearing. Restated, by permitting limited movement of the valve seat 24 in the direction of movement of plug member 34, in addition to allowing for rotation of seat member 24, a condition is obtained wherein the two movable members will always assume a position relative to one another which insures good seating when the plug member 34 is wedged into the seat member 24 and thereby in turn wedges the seat member into the walls of the passage in web member 20. It is also to be noted that, unlike the embodiment of FIGS. 1 and 3, the embodiment of FIGS. 4 and 5 does not rely upon tight contact between the surface of sail member 38 and an upper flange member 28 to enhance sealing.

In either of the disclosed embodiments, should either the valve seat 24 or disk member 32 become worn or damaged, replacement thereof, without disconnecting the valve from the fluid system, is accomplished merely by unscrewing cap 18 thereby permitting access to the interior of the valve. Should it be desired to replace the valve seat, it may either be cut or pulled free by means of a tool designed for that purpose. The old seat will then be discarded and a new valve seat snapped into position. Since they are formed from a plastic material, the valve seat and disk members are relatively inexpensive and thus replacement thereof is economically sound. The valve body, which is the most expensive element of the valve, will have an indefinite life in the present invention.

It should be noted that, due to the light weight and the particular configuration of disk member 32, the valve of the present invention may be employed in both liquid and gas systems and the valve will operate in any position. The ability to operate in any position is a direct result of the fact that the valve has only a single moving part which is controlled solely and operated fully by the system pressure differential.

While a preferred embodiment has been shown and described, various modifications and substitutions may be made thereto without departing from the spirit and scope of the present invention. Accordingly, it is to be understood that the present invention has been described by way of illustration and not limitation.

What I claim is:
1. A valve assembly comprising:
a valve body;
input connector means on said body whereby said body may be connected to a source of fluid;
output connector means on said body whereby said body may be connected to apparatus to which fluid is to be delivered from the source;
apertured valve-seat-supporting means disposed in said body intermediate of said input and output connector means;
a valve seat positioned in the aperture in said supporting means, said valve seat being comprised of plastic material and having an inner frustoconical aperture-defining surface, the valve seat further having an outer surface-defining portion and a flange extending outwardly from at least one end thereof, said outer-surface-defining portion having an external shape complementary to the shape of the aperture in said supporting means and said flange having a size and shape sufficient to retain said valve seat in the aperture in said seat-supporting means, the valve seat being free to move a limited distance axially of said aperture in said supporting means and said flange being spaced from said seat-supporting means when said valve is in the closed position; and a one-piece disk member comprised of plastic material which cooperates solely with said seat to perform the valving function, said disk member having a frustoconical plug portion for mating with and engaging said valve-aeat-aperture-defining surface.

2. The apparatus of claim 1 wherein said disk member further comprises:
a guidepost extending coaxially of said plug portion; and
a sail member disposed intermediate said plug portion and guidepost, said sail portion having radially extending upper and lower reaction surfaces.

3. The apparatus of claim 1 further comprising:
an apertured guide member supported by said body and extending inwardly toward said seat, said guide member cooperating with said disk member to define the direction of movement of said disk member.

4. The apparatus of claim 1 wherein said outer-surface-defining portion of said seat and said aperture in said supporting means are tapered.

5. A valve assembly comprising:
a valve body;
input connector means on said body whereby said body may be connected to a source of fluid;
output connector means on said body whereby said body may be connected to apparatus to which fluid is to be delivered from the source;
valve-seat-supporting means disposed in said body intermediate of said input and output connector means, said supporting means having a tapered aperture therethrough;
an apertured valve seat positioned in the aperture in said supporting means, said valve seat having a tapered outer-surface-defining portion and a flange extending outwardly from one end thereof, said tapered portion having an external shape complementary to the shape of the aperture in said supporting means and said flange having a size and shape sufficient to retain said valve seat in the aperture in said seat-supporting means; and
a disk member which cooperates with said seat to perform the valving function, said disk member being movable with respect to said valve seat between an open position for the valve spaced from said valve seat and a closed position for the valve engaging at least part of said valve seat;
said valve seat being free to move a limited distance axially of said aperture in said supporting means when said valve is in said open position.

6. The apparatus of claim 5 wherein said flange is spaced from said seat-supporting means when said valve is in the closed position with said disk member seated in said seat.

7. The apparatus of claim 6 wherein said seat and disk member are both comprised of a plastic material and said body and supporting means are metal.

8. The apparatus of claim 7 wherein the aperture in said seat is frustoconical in shape with its smaller diameter opening facing in the upstream direction.

9. The apparatus of claim 8 wherein said disk member comprises:
a plug portion commensurate in shape with the aperture in said seat;
a guidepost extending coaxially of said plug portion; and
a sail member disposed intermediate said plug portion and guidepost, said sail portion having radially extending upper and lower reaction surfaces.

10. The apparatus of claim 9 wherein said valve body comprises:
means defining a fluid path between said connector means;
means defining an access port through said valve body downstream of said supporting means; and
cap means normally closing said access port, said cap means defining a channel which engages said disk means guidepost.